United States Patent
Xu et al.

(10) Patent No.: US 11,531,813 B2
(45) Date of Patent: Dec. 20, 2022

(54) METHOD, ELECTRONIC DEVICE AND READABLE STORAGE MEDIUM FOR CREATING A LABEL MARKING MODEL

(71) Applicant: BEIJING BAIDU NETCOM SCIENCE AND TECHNOLOGY CO., LTD., Beijing (CN)

(72) Inventors: Xinchao Xu, Beijing (CN); Haifeng Wang, Beijing (CN); Hua Wu, Beijing (CN); Zhanyi Liu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 79 days.

(21) Appl. No.: 17/015,411

(22) Filed: Sep. 9, 2020

(65) Prior Publication Data

US 2021/0294975 A1    Sep. 23, 2021

(30) Foreign Application Priority Data

Mar. 19, 2020    (CN) .......................... 202010195678.5

(51) Int. Cl.
*G06F 40/284*      (2020.01)
*G06F 40/274*      (2020.01)
(Continued)

(52) U.S. Cl.
CPC .......... *G06F 40/284* (2020.01); *G06F 40/274* (2020.01); *G06N 3/08* (2013.01); *G10L 15/04* (2013.01); *G10L 15/063* (2013.01)

(58) Field of Classification Search
None
See application file for complete search history.

(56) References Cited

U.S. PATENT DOCUMENTS 11,182,564 B2 *   11/2021   Li ........................... G06F 40/30
2012/0150531 A1    6/2012   Bangalore et al.
(Continued)

FOREIGN PATENT DOCUMENTS

CN    106683667 A    5/2017
CN    107844476 A    3/2018
(Continued)

OTHER PUBLICATIONS

Zhang Peng, Part-of-speech tagging method and labeling system, Priority on Nov. 9, 2017, pp. 1-10, Machine Translation by Google of CN 109766523 A, Retrieved on Jan. 20, 2022 (Year: 2017).*
(Continued)

*Primary Examiner* — Jonathan C Kim
*Assistant Examiner* — Jonathan Ernesto Amaya Hernandez
(74) *Attorney, Agent, or Firm* — Brooks Kushman P.C.

(57) ABSTRACT

A method, an electronic device and a readable storage medium for creating a label marking model are disclosed. The method for creating the label marking model includes: obtaining text data and determining a word or phrase to be marked in the text data; according to the word or phrase to be marked, constructing a first training sample of the text data corresponding to a word or phrase replacing task and a second training sample corresponding to a label marking task; training a neural network model with a plurality of the first training samples and a plurality of the second training samples, respectively, until a loss function of the word or phrase replacing task and a loss function of the label marking task satisfy a preset condition, to obtain the label marking model.

17 Claims, 2 Drawing Sheets

(51) Int. Cl.
*G06N 3/08* (2006.01)
*G10L 15/04* (2013.01)
*G10L 15/06* (2013.01)

(56) References Cited

U.S. PATENT DOCUMENTS

| | | | |
|---|---|---|---|
| 2017/0177563 A1 | 6/2017 | Dahlmeier et al. | |
| 2018/0137404 A1* | 5/2018 | Fauceglia | G06N 3/0445 |
| 2020/0081978 A1 | 3/2020 | Ahmed et al. | |
| 2020/0342055 A1* | 10/2020 | Patra | G06F 40/30 |
| 2021/0004672 A1* | 1/2021 | Glass | G06F 16/285 |
| 2021/0027018 A1* | 1/2021 | Lin | G06N 3/08 |
| 2021/0027141 A1* | 1/2021 | MacAvaney | G06V 10/768 |
| 2021/0150338 A1* | 5/2021 | Semenov | G06V 10/82 |
| 2021/0342212 A1* | 11/2021 | Neumann | G06F 3/167 |

FOREIGN PATENT DOCUMENTS

| | | |
|---|---|---|
| CN | 109766523 A | 5/2019 |
| CN | 109977361 A | 7/2019 |
| CN | 110162191 A | 8/2019 |
| JP | 5901001 B1 | 4/2016 |
| WO | 2018028077 A1 | 2/2018 |

OTHER PUBLICATIONS

Machine Translation of Zheng et al. provided in IDS, WO 2018028077 A1, Feb. 15, 2018, doc code NPL (Year: 2018).*
Office Action for corresponding Chinese Application 202010195678.5 dated Jun. 7, 2021, 6 pages.
Search Report for corresponding Chinese Application 202010195678.5 dated May 31, 2021, 2 pages.
Extended European Search Report of European Appln No. 21153337.7 dated Jul. 7, 2021.
Office Action for corresponding Chinese Application 202010195678.5 dated Mar. 16, 2021, 7 pages.
Search Report for corresponding Chinese Application 202010195678.5 dated Feb. 26, 2021, 2 pages.

* cited by examiner

METHOD, ELECTRONIC DEVICE AND READABLE STORAGE MEDIUM FOR CREATING A LABEL MARKING MODEL

CROSS-REFERENCE TO RELATED APPLICATIONS

The present application claims the priority and benefit of Chinese Patent Application No. 2020101956785, fled on Mar. 19, 2020. The disclosure of the above application is incorporated herein by reference in its entirety.

TECHNICAL FIELD

The present disclosure relates to the technical field of artificial intelligence, and particularly to a method, an apparatus, an electronic device and a readable storage medium for creating a label marking model in the technical field of natural language processing.

BACKGROUND

In related art, when a label marking model is trained, the labels are marked by learning the information of the word or phrase to be marked themselves without sufficiently learning the relationship between the marked label word or phrase and a context where the word or phrase to be marked lies. This causes reduction of the accuracy of the label marking model in marking the word or phrase to be marked on the one hand, and on the other hand, limits application scenarios where the label marking model marks.

SUMMARY

A technical solution employed by the present disclosure to solve technical problems is to provide a method for creating a label marking model. According to an embodiment, the method may include: obtaining text data and determining a word or phrase to be marked in the text data; according to the word or phrase to be marked, constructing a first training sample of the text data corresponding to a word or phrase replacing task and a second training sample corresponding to a label marking task; and training a neural network model with a plurality of the first training samples and a plurality of the second training samples, respectively, until a loss function of the word or phrase replacing task and a loss function of the label marking task satisfy a preset condition, to obtain a label marking model. The technical solution may improve the accuracy of the label marking model performing word marking, and enable the label marking model to adapt for multiple types of marking scenarios.

According to an embodiment of the present disclosure, the determining the word or phrase to be marked in the text data includes: obtaining part-of-speeches of words or phrases in the text data after performing word segmentation on the text data; and taking a word or phrase whose part-of-speech belongs to a preset part-of-speech as the word or phrase to be marked. This may avoid the user from manually determining the word or phrase to be marked and improve the efficiency in creating the label marking model.

According to an embodiment of the present disclosure, constructing the first training sample of the text data corresponding to the word or phrase replacing task according to the word or phrase to be marked may include: obtaining a substitute word or phrase corresponding to the word or phrase to be marked; after replacing the word or phrase to be marked in the text data with the substitute word or phrase, taking a class of the substitute word or phrase as a replacement class marking result of a replacement text; and taking the replacement text and the replacement class marking result corresponding to the replacement text as the first training sample. In this step, the training samples are constructed according to different training tasks, and the accuracy in training the model may be improved.

According to an embodiment of the present disclosure, constructing the second training sample of the text data corresponding to the label marking task according to the word or phrase to be marked may include: obtaining a label word or phrase associated with the word or phrase to be marked, and taking the label word or phrase as a label marking result of the word or phrase to be marked; and taking the text data, the word or phrase to be marked and the label marking result corresponding to the word or phrase to be marked as the second training sample. In this step, the training samples are trained according to different training tasks, and the accuracy in training the model may be improved.

According to an embodiment of the present disclosure, the obtaining the substitute word or phrase corresponding to the word or phrase to be marked may include: determining identification information of the word or phrase to be marked in a preset knowledge base; and obtaining the substitute word or phrase in the preset knowledge base corresponding to the identification information. In this step, the substitute word or phrase is obtained through the preset knowledge base, and the accuracy in training sample constructions may be improved.

According to an embodiment of the present disclosure, training the neural network model with a plurality of the first training samples may include: taking the replacement text as input, and taking the replacement class marking result corresponding to the replacement text as output, so that the neural network model is able to, according to the input replacement text, output a probability that the input replacement text belongs to a replacement class.

According to an embodiment of the present disclosure, training the neural network model with a plurality of the second training samples may include: taking the text data and the word or phrase to be marked as input, and taking the label marking result corresponding to the word or phrase to be marked as output, so that the neural network model is able to, according to the input text data and the word or phrase to be marked, output a probability that the label word or phrase belong to the label marking result of the word or phrase to be marked.

According to an embodiment of the present disclosure, training the neural network model with a plurality of the first training samples may include: dividing the word or phrase replacing task into a label word or phrase replacing subtask and an appositive word or phrase replacing subtask; and completing the training with the word or phrase replacing task based on the training samples in the plurality of the first training samples corresponding to the two subtasks. In this step, the word or phrase replacing task is divided into two subtasks for training, so that the neural network model may be enabled to more accurately distinguish the label word replacement from the appositive word replacement, and the accuracy of model marking may be further improved.

A technical solution employed by the present disclosure to solve the current technical problems is to provide an apparatus for creating a label marking model. According to an embodiment, the apparatus may include: an obtaining unit configured to obtain text data and determine a word or phrase to be marked in the text data; a constructing unit configured to, according to the word or phrase to be marked, construct a first training sample of the text data corresponding to a word or phrase replacing task and a second training sample corresponding to a label marking task; and a training unit configured to train a neural network model with a plurality of the first training samples and a plurality of the second training samples, respectively until a loss function of the word or phrase replacing task and a loss function of the label marking task satisfy a preset condition, to obtain a label marking model.

According to an embodiment of the present disclosure, upon determining the word or phrase to be marked in the respective text data, the obtaining unit specifically performs: obtaining part-of-speeches of words or phrases in the text data after performing word segmentation on the text data; and taking a word or phrase whose part-of-speech belongs to a preset part-of-speech as the word or phrase to be marked.

According to an embodiment of the present disclosure, upon constructing the first training sample of the text data corresponding to the word or phrase replacing task according to the word or phrase to be marked, the constructing unit specifically performs: obtaining a substitute word or phrase corresponding to the word or phrase to be marked, after replacing the word or phrase to be marked in the text data with the substitute word or phrase, taking a class of the substitute word or phrase as a replacement class marking result of a replacement text; and taking the replacement text and the replacement class marking result corresponding to the replacement text as the first training sample.

According to an embodiment of the present disclosure, upon constructing the second training sample of the text data corresponding to the label marking task according to the word or phrase to be marked, the constructing unit specifically performs: obtaining a label word or phrase associated with the word or phrase to be marked, and taking the label word or phrase as a label marking results of the word or phrase to be marked; and taking the text data, the word or phrase to be marked and the label marking results corresponding to the word or phrase to be marked as the second training sample.

According to an embodiment of the present disclosure, upon obtaining the substitute word or phrase corresponding to the word or phrase to be marked, the constructing unit specifically performs: determining identification information of the word or phrase to be marked in a preset knowledge base; and obtaining the substitute word or phrase in the preset knowledge base corresponding to the identification information.

According to an embodiment of the present disclosure, upon training the neural network model with a plurality of the first training samples, the training unit specifically performs: taking the replacement text as input, and taking the replacement class marking result corresponding to the replacement text as output, so that the neural network model is able to, according to the input replacement text, output a probability that the input replacement text belongs to a replacement class.

According to an embodiment of the present disclosure, upon training the neural network model with a plurality of the second training samples, the training unit specifically performs: taking the text data and the word or phrase to be marked as input, and taking the label marking results corresponding to the word or phrase to be marked as output, so that the neural network model is able to, according to the input text data and word or phrase to be marked, output a probability that the label word or phrase belong to the label marking result of the word or phrase to be marked.

According to an embodiment of the present disclosure, upon training the neural network model with a plurality of the first training samples, the training unit specifically performs: dividing the word or phrase replacing task into a label word or phrase replacing subtask and an appositive word or phrase replacing subtask; and completing the training with the word or phrase replacing task based on the training samples in the plurality of first training samples corresponding to the two subtasks.

Embodiments of the present disclosure may have the following advantages or advantageous effects: the technical solution may improve the accuracy of the label marking model performing word marking, and enable the label marking model to adapt for multiple types of marking scenarios. Since technical solution of training the word or phrase replacing task and the label marking task are employed during the creating of the label marking model, the technical problem in related art that attention is only paid to a lower marking accuracy and limitations of marking application scenarios caused by word or phrase to be marked is solved, thereby achieving a technical effect of enabling the label marking model to adapt for multiple types of marking scenarios whilst improving the word marking accuracy.

Other effects of the above optional modes will be described hereunder in conjunction with various embodiments.

BRIEF DESCRIPTION OF THE DRAWINGS

The figures are intended to facilitate understanding the solutions, not to limit the present disclosure. In the figures.

DETAILED DESCRIPTION

Exemplary embodiments of the present disclosure are described below with reference to the accompanying drawings, include various details of the embodiments of the present disclosure to facilitate understanding, and should be considered as merely exemplary. Therefore, those having ordinary skill in the art should recognize that various changes and modifications may be made to the embodiments described herein without departing from the scope and spirit of the application. Also, for the sake of clarity and conciseness, depictions of well-known functions and structures are omitted in the following description.

Figure 1:
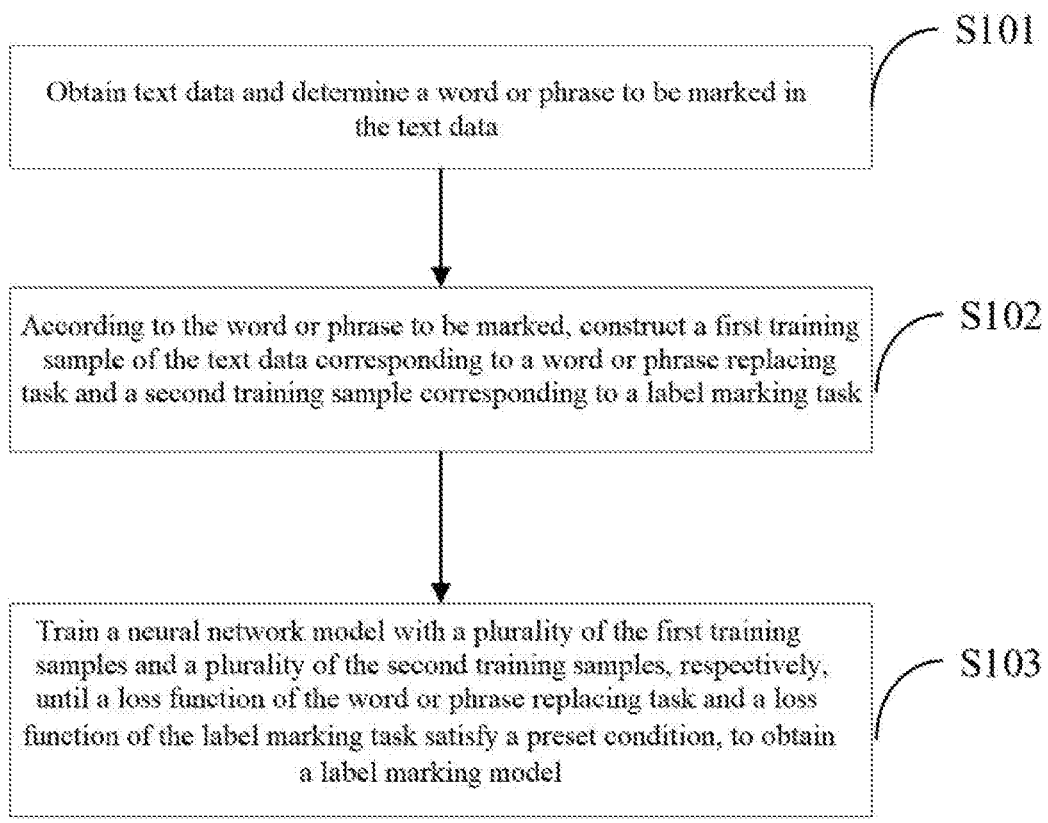
FIG. 1 illustrates a flow chart of a method for creating a label marking model according to an embodiment of the present disclosure.

FIG. 1 illustrates a flow chart of a method for creating a label marking model according to an embodiment of the present disclosure. With reference to FIG. 1, the method includes:

At S101, text data is obtained, and a word or phrase to be marked in the text data is determined.

In this step, text data is obtained first, and then a word or phrase to be marked in the text data is determined. The determined word or phrase to be marked is a word or phrase to be label-marked in the text data.

In the step, the content input by the user may be taken as the text data; to increase the amount of text data, content crawled from the network may also be taken as text data in this step.

Specifically, in this step, when the word or phrase to be marked in the respective text data is determined, a word or phrase designated by the user in the text data may be taken as the word or phrase to be marked, for example, a certain one or more words or phrases designated by the user for the text data may be taken as the word or phrase to be marked.

To avoid excessive participation of the user and enhance the efficiency in creating the label marking model, the following manner may also be employed when the word or phrase to be marked in the text data is determined in this step: obtaining part-of-speeches of words or phrases in the text data after performing word segmentation on the text data; taking a word or phrase whose part-of-speech belongs to a preset part-of-speech as the word or phrase to be marked. The preset part-of-speech in this step may be a noun or nouns, namely, a noun or nouns in the text data may be taken as the word or phrase to be marked in this step.

At S102, according to the word or phrase to be marked, a first training sample of the text data corresponding to a word or phrase replacing task and a second training sample corresponding to a label marking task are constructed.

In this step, after the word or phrase to be marked in the text data is determined in step S101, the first training sample of the text data corresponding to the word or phrase replacing task and the second training sample corresponding to the label marking task are constructed according to the determined word or phrase to be marked. In another words, in this step, two types of training samples are constructed for the same text data: one type of training sample corresponds to the word or phrase replacing task, and the other type of training sample corresponds to the label marking task.

In an embodiment, the word or phrase replacing task is a task of using a corresponding type of word or phrase to replace the word or phrase to be marked in the text data, and then predicting a replacement class to which an obtained replacement text belongs. This training task is able to learn a representation of a word or phrase to be marked, a representation of a label word or phrase and a relationship of the label word or phrase in the context; the label marking task in an embodiment of the present disclosure is a task of predicting a label corresponding to a word or phrase to be marked, according to the text data and the word or phrase to be marked therein.

What is predicted by the word or phrase replacing task is a replacement class to which the replacement text belongs. Hence, when the first training sample corresponding to the word or phrase replacing task is constructed in this step, one or more different classes of substitute words or phrases corresponding to the word or phrase to be marked need to be obtained, thereby obtaining one or more replacement text of different replacement classes corresponding to the text data.

Specifically, the following manner may be employed upon constructing the first training sample of the text data corresponding to the word or phrase replacing task according to the word or phrase to be marked in this step: obtaining a substitute word or phrase corresponding to the determined word or phrase to be marked, where the substitute word or phrase include at least one type of the following: a label word or phrase associated with the word or phrase to be marked, an appositive word or phrase associated with the word or phrase to be marked, and a label word or phrase not associated with the word or phrase to be marked; after replacing the word or phrase to be marked in the text data with the substitute word or phrase, taking a class of the substitute word or phrase as a replacement class marking result of a replacement text, where the replacement class marking result includes a label word replacement class, an appositive word replacement class and/or an unassociated label word replacement class; taking the replacement text and the replacement class marking result corresponding to the replacement text as the first training sample.

It may be appreciated that in this step, an un-replaced text (namely, original text data) and a non-replacement class marking result corresponding to the un-replaced text may also be added to the first training sample.

In this step, the label word or phrase associated with a word or phrase to be marked is a generic concept word or phrase corresponding to the word or phrase to be marked, namely, a word or phrase in a field or attribute to which the word or phrase to be marked belongs; the appositive word or phrase associated with the word to be marked is other word or phrase sharing the same generic concept word or phrase with the word or phrase to be marked, for example, other word or phrase in the same field or attribute as the word or phrase to be marked; the label word or phrase not associated with the word or phrase to be marked is a generic concept word or phrase not corresponding to the word or phrase to be marked.

For example, if the word or phrase to be marked is "My motherland and Me", the label word or phrase associated with the word or phrase to be marked may include "Movie" or "National Day Celebrating Movie" etc.; the appositive word or phrase associated with the word or phrase to be marked may include "Yellow Earth" "The Big Parade" and "Farewell My Concubine" which also belong to movies; the label word or phrase not associated with the word or phrase to be marked may include "Director", "Television series", "Star" etc.

In addition, in this step the following manner may be employed upon constructing the second training sample of the text data corresponding to the label marking task according to the word or phrase to be marked: obtaining a label word or phrase associated with the word or phrase to be marked, and taking the obtained label word or phrase as a label marking result of the word or phrase to be marked; taking the text data, the word or phrase to be marked and the label marking result of the word or phrase to be marked as the second training sample.

For example, if the text data is "My motherland and Me shown in the cinema recently is directed by the General Director Kaige Chen", and if the word or phrase to be marked is "My motherland and Me", "Movie" or "National Day Celebrating Movie" etc. associated with "My motherland and Me" may be taken as a label marking result.

It may be appreciated that in this step, the substitute word or phrase such as the label word or phrase associated with word or phrase to be marked, the appositive word or phrase associated with the word or phrase to be marked and the label word or phrase not associated with the word or phrase to be marked may be obtained by performing search on the Internet for the word or phrase to be marked.

To improve the accuracy in obtaining the substitute word or phrase, the following manner may be employed upon obtaining the substitute word or phrase corresponding to the word or phrase to be marked in this step: determining identification information of the word or phrase to be marked in a preset knowledge base because different words or phrases to be marked might have the same meaning, and using one piece of identification information to represent a plurality of words or phrases having the same meaning may reduce a redundancy degree of words or phrases included in the preset knowledge base; obtaining a substitute word or phrase in the preset knowledge base corresponding to the determined identification information.

The substitute word or phrase in the preset knowledge base corresponding to the identification information may be established by collecting entry labels corresponding to entries in a current encyclopedia knowledge base, so that the user needn't collect and collate label word or phrase, thereby greatly improving the efficiency in creating the label marking model.

At S103, a neural network model is trained with a plurality of the first training samples and a plurality of the second training samples, respectively, until a loss function of the word or phrase replacing task and a loss function of the label marking task satisfy a preset condition, and the label marking model is obtained.

In this step, after the first training sample corresponding to the word or phrase replacing task and the second training sample corresponding to the label marking task are constructed in step S102, the constructed first training sample and second training sample are respectively used to train the neural network model, until when the loss function of the corresponding word or phrase replacing task and the loss function of the corresponding label marking task satisfy the preset condition, training is stopped and the label marking model is obtained. In this step, the neural network model used may be an attention mechanism model such as a transformer model.

By the label marking model obtained in this step, a probability that the input text data belong to different replacement classes may be predicted on the one hand, and on the other hand a probability that a label belongs to the label marking result of the word or phrase may be predicted according to the input text data and the word or phrase to be marked.

In this step, the neural network model is trained based on a multi-task label marking framework. Hence, in this step, it is possible to first train the neural network model with the word or phrase replacing task and then train the neural network model with the label marking task; or first train the neural network model with the label marking task, and then train the neural network model with the word or phrase replacing task; or train the neural network model with the above two tasks in an alternating training manner.

In this step, when the model is trained with the word or phrase replacing task, the replacement text is taken as input of the neural network model, and the replacement class marking result corresponding to the replacement text is taken as output of the neural network model, so that the neural network model is able to, according to the input text data, output a probability that the input replacement text belongs to the a replacement class; when the neural network model is trained with the label marking task, the text data and the word or phrase to be marked is taken as the input, and the label marking results corresponding to the word or phrase to be marked is taken as the output, so that the neural network model is able to, according to the input text data and the word or phrase to be marked, output a probability that the label word or phrase belong to the label marking results of the word or phrase to be marked.

It may be appreciated that in this step, the loss functions corresponding to the word or phrase replacing task and the label marking task may be represented with a cross-entropy loss function. The types of the loss functions are not limited in the present disclosure. In addition, in this step, the preset condition satisfied by the loss functions may include: the loss functions are smaller than or equal to a preset threshold, or the loss functions obtained in preset times are equal, or a difference between loss functions obtained in the preset times is smaller than or equal to a preset threshold, etc.

In addition, upon the training with the word or phrase replacing task in this step, the word or phrase replacing task may be divided into two subtasks for training: one is a label word or phrase replacing subtask and the other is an appositive word or phrase replacing subtask. In this training manner, the neural network model may be enabled to more accurately distinguish the label word or phrase replacement from the appositive word or phrase replacement.

In this step, when the label word or phrase replacing subtask is used to train the neural network model, training may be performed by using replacement text whose replacement class includes a non-replacement class, a label word replacement class and an unassociated label word replacement class, and the loss function corresponding thereto is J1; when the appositive word or phrase replacing subtask is used to train the neural network model, training may be performed with replacement text whose replacement class includes a non-replacement class and an appositive word or phrase replacement class, and the loss function corresponding thereto is J2; a target of performing the word or phrase replacing task in this manner is to fuse targets of the two tasks, i.e., to achieve a balance between substitute word or phrase of the word or phrase to be marked in terms of commonality and difference, and a final loss function of the word or phrase replacing task is $J=a \times J1+(1-a) \times J2$, where a is a parameter for balancing two task targets, with a value in a range of 0-1.

Before training the neural network model with the first training sample and second training sample, it is further possible to pre-train the neural network model based on a large-scale corpus, thereby initializing parameters in the neural network model so that the neural network model after the pre-training has a certain label marking capability.

Since the label marking model is trained through two tasks, the label marking model may mark word or phrase labels for two application scenarios: one is a scenario with candidate label word or phrase, and the other is a scenario without candidate label word or phrase.

Under the application scenario with candidate label word or phrase, the following manner may be employed upon using the label marking model to mark the word or phrase to be marked in the text data: after replacing the word or phrase to be marked in the text data with the candidate label word or phrase, inputting the replacement text into the label marking model; according to an output result of the label marking model, taking a probability that the replacement text belongs to the label word replacement class as a score result of the candidate label word or phrase; taking a candidate label word or phrase whose score result satisfies a first preset condition as the label marking result of the word or phrase to be marked, e.g., soring the candidate label words or phrases according to the score results, and taking a candidate label word or phrase ranking the first as the label marking result of the word or phrase to be marked.

Under the application scenario without candidate label word or phrase, the following manner may be employed upon using the label marking model to mark the word or phrase to be marked in the text data: inputting the text data and the word or phrase to be marked into the label marking model; according to an output result of the label marking model, taking a probability that the label word or phrase belongs to the label marking results of the word or phrase to be marked as a score result of each of the label word or phrase; selecting a label word whose score result satisfies a second preset condition as the label marking result of the word or phrase to be marked, e.g., selecting a label word or phrase whose score result exceeds a preset threshold as the label marking result of the word or phrase to be marked.

Hence, in the present disclosure, when the label marking model is created by the above method, training is performed for the normal label marking task, and training is also performed for the word or phrase replacing task, so that the created label marking model may, in addition to learning the information of the word or phrase themselves, sufficiently learn the relationship between the context of the word or phrase and the label word or phrase thereof, and so that the label marking model may adapt for multiple marking scenarios whilst improving the accuracy in marking word or phrase.

Figure 2:
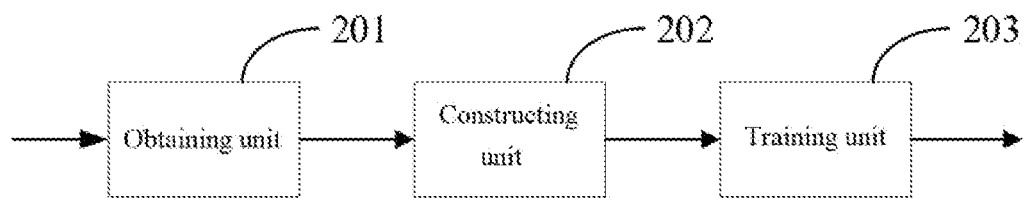
FIG. 2 illustrates a schematic structural diagram of an apparatus for creating a label marking model according to an embodiment of the present disclosure.

FIG. 2 illustrates a schematic structural diagram of an apparatus for creating a label marking model according to a second embodiment of the present disclosure. With reference to FIG. 2, the apparatus includes: an obtaining unit 201, a constructing unit 202 and a training unit 203.

The obtaining unit 201 is configured to obtain text data and determine a word or phrase to be marked in the text data.

The obtaining unit 201 first obtains the text data, and then determines a word or phrase to be marked in the text data. The determined word or phrase to be marked is a word or phrase to be label-marked in the text data.

The obtaining unit 201 may take the content input by the user as the text data; to increase the amount of text data, the obtaining unit 201 may further crawl content from the network as text data.

Specifically, obtaining unit 201, upon determining the word or phrase to be marked in the respective text data, take a word or phrase designated by the user in the text data as the word or phrase to be marked, for example, take a certain one or more words or phrases designated by the user for the text data as the word or phrase to be marked.

To avoid excessive participation of the user and enhance the efficiency in creating the label marking model, the obtaining unit 201 may employ the following manner upon determining the word or phrase to be marked in the text data: obtaining part-of-speeches of words or phrases in the text data after performing word segmentation on the text data; taking a word or phrase whose part-of-speech belongs to a preset part-of-speech as the word or phrase to be marked. The preset part-of-speech may be a noun or nouns, namely, the obtaining unit 201 takes a noun or nouns in the text data as the word or phrase to be marked.

The constructing unit 202 is configured to, according to the word or phrase to be marked, construct a first training sample of the text data corresponding to a word or phrase replacing task and a second training sample corresponding to a label marking task.

After the obtaining unit 201 determines the word or phrase to be marked in the respective text data, the constructing unit 202 constructs the first training sample of the text data corresponding to the word or phrase replacing task and the second training sample corresponding to the label marking task according to the determined word or phrase to be marked. That is to say, the constructing unit 202 constructs two types of training samples for the same text data: one type of training sample corresponds to the word or phrase replacing task, and the other type of training sample corresponds to the label marking task.

In the present disclosure, the word or phrase replacing task is a task of using a corresponding type of word or phrase to replace the word or phrase to be marked in the text data, and then predicting a replacement class to which an obtained replacement text belongs. This training task is able to learn a representation of a word or phrase to be marked, a representation of label word or phrase and a relationship of the label word or phrase in the context; the label marking task in the an embodiment of present disclosure is a task of predicting a label corresponding to a word or phrase to be marked, according to the text data and the word or phrase to be marked therein.

What is predicted by the word or phrase replacing task is a replacement class to which the replacement text belongs. Hence, the constructing unit 202, upon constructing the first training sample corresponding to the word or phrase replacing task, needs to obtain one or more different classes of substitute words or phrases corresponding to the word or phrase to be marked, thereby obtaining one or more replacement texts of different replacement classes corresponding to the text data.

Specifically, the constructing unit 202 employs the following manner upon constructing the first training sample of the text data corresponding to the word or phrase replacing task according to the word or phrase to be marked: obtaining a substitute word or phrase corresponding to the determined word or phrase to be marked, where the substitute word or phrase include at least one type of the following: a label word or phrase associated with the word or phrase to be marked, an appositive word or phrase associated with the word or phrase to be marked, and a label word or phrase not associated with the word or phrase to be marked; after replacing the word or phrase to be marked in the text data with the substitute word or phrase, taking a class of the substitute word or phrase as a replacement class marking result of a replacement text, where the replacement class marking result includes a label word replacement class, an appositive word replacement class and/or an unassociated label word replacement class; taking the replacement text and the replacement class marking result corresponding to the replacement text as the first training sample.

It may be appreciated that the constructing unit 202 may further add an un-replaced text (namely, original text data) and a non-replacement class marking result corresponding to the un-replaced text to the first training sample.

In the constructing unit 202, the label word or phrase associated with the word or phrase to be marked is a generic concept word or phrase corresponding to the word or phrase to be marked, namely, a word or phrase in a field or attribute to which the word or phrase to be marked belongs; the appositive word or phrase associated with the word or phrase to be marked is other word or phrase sharing the same generic concept word or phrase with the word or phrase to be marked, for example, other word or phrase in the same field or attribute as the word or phrase to be marked; the label word or phrase not associated with the word or phrase to be marked is a generic concept word or phrase not corresponding to the word or phrase to be marked.

In addition, the constructing unit 202 may employ the following manner upon constructing the second training sample of the text data corresponding to the label marking task according to the word or phrase to be marked: obtaining a label word or phrase associated with the word or phrase to be marked, and taking the obtained label word or phrase as a label marking result of the word or phrase to be marked; taking the text data, the word or phrase to be marked and the label marking result of the word or phrase to be marked as the second training sample.

It may be appreciated that the constructing unit 202 obtains the substitute word or phrase such as the label word or phrase associated with word or phrase to be marked, appositive word or phrase associated with the word or phrase to be marked and label word or phrase not associated with the word or phrase to be marked by performing search on the Internet for the word or phrase to be marked.

To improve the accuracy in obtaining the substitute word or phrase, the constructing unit 202 may employ the following manner upon obtaining the substitute word or phrase corresponding to the word or phrase to be marked: determining identification information of the word or phrase to be marked in a preset knowledge base because different word or phrase to be marked might have the same meaning, and using one piece of identification information to represent a plurality of word or phrase having the same meaning may reduce a redundancy degree of word or phrase included in the preset knowledge base; obtaining a substitute word or phrase in the preset knowledge base corresponding to the determined identification information.

The substitute word or phrase in the preset knowledge base corresponding to the respective identification information may be established by collecting entry labels corresponding to entries in a current encyclopedia knowledge base, so that the user needn't collect and collate label word or phrase, thereby greatly improving the efficiency in creating the label marking model.

The training unit 203 is configured to train a neural network model with a plurality of the first training samples and a plurality of the second training samples, respectively, until a loss function of the word or phrase replacing task and a loss function of the label marking task satisfy a preset condition, to obtain and the label marking model.

After the constructing unit 202 constructs the first training sample corresponding to the word or phrase replacing task and the second training sample corresponding to the label marking task, the training unit 203 uses the constructed first training sample and second training sample respectively to train the neural network model, until the loss function of the corresponding word or phrase replacing task and the loss function of the corresponding label marking task satisfy the preset condition, and then training is stopped and the label marking model is obtained. The neural network model used by the training unit 203 may be an attention mechanism model such as a transformer model.

By the label marking model obtained by the training unit 203, a probability that the input text data belong to different replacement classes may be predicted on the one hand, and on the other hand a probability that a label belongs to the label marking result of the word or phrase may be predicted according to the input text data and the word or phrase to be marked.

Since the training unit 203 trains the neural network model based on a multi-task label marking framework, the training unit 203 may first train the neural network model with the word or phrase replacing task and then train the neural network model with the label marking task; or first train the neural network model with the label marking task, and then train the neural network model with the word or phrase replacing task; or train the neural network model with the above two tasks in an alternating training manner.

Upon training the neural network model with the word or phrase replacing task, the training unit 203 takes the replacement text as input of the neural network model, and takes the replacement class marking result corresponding to the replacement text as output of the neural network model, so that the neural network model is able to, according to the input text data, output a probability that the input replacement text belongs to a replacement class; upon training the neural network model with the label marking task, the training unit 203 takes the text data and the word or phrase to be marked as the input, and takes the label marking result corresponding to the word or phrase to be marked as the output, so that the neural network model is able to, according to the input text data and word or phrase to be marked, output a probability that respective label word or phrase belong to the label marking result of the word or phrase to be marked.

It may be appreciated that in the training unit 203, the loss functions corresponding to the word or phrase replacing task and the label marking task may be represented with a cross-entropy loss function. The types of the loss functions are not limited in the present disclosure. In addition, in the training unit 203, the preset condition satisfied by the loss functions may include: the loss functions are smaller than or equal to a preset threshold, or the loss functions obtained in preset times are equal, or a difference between loss functions obtained in the preset times is smaller than or equal to a preset threshold, etc.

In addition, upon the training with the word or phrase replacing task, the training unit 203 may divide the word or phrase replacing task into two subtasks for training: one is a label word or phrase replacing subtask and the other is an appositive word or phrase replacing subtask. In this training manner, the neural network model may be enabled to more accurately distinguish the label word replacement from the appositive word replacement.

When the training unit 203 trains the neural network model with the label word or phrase replacing subtask, it trains by using replacement texts whose replacement classes are a non-replacement class, a label word replacement class and an unassociated label word replacement class, and the loss function corresponding thereto is J1; when the training unit 203 trains the neural network model with the appositive word or phrase replacing subtask, it trains with replacement texts whose replacement classes are a non-replacement class and an appositive word replacement class, and the loss function corresponding thereto is J2; a target of performing the word or phrase replacing task in this manner is to fuse targets of the two tasks, i.e., to achieve a balance between substitute word or phrase of the word or phrase to be marked in terms of commonality and difference, and a final loss function of the word or phrase replacing task is $J=a \times J1+(1-a) \times J2$, where a is a parameter for balancing two task targets, with a value in a range of 0-1.

Before training the neural network model with the first training sample and second training sample, the training unit 203 pre-trains the neural network model based on a large-scale corpus, thereby initializing parameters in the neural network model so that the neural network model after the pre-training has a certain label marking capability.

Since the label marking model is trained through two tasks, the label marking model may mark word labels for two application scenarios: one is a scenario with candidate label word or phrase, and the other is a scenario without candidate label word or phrase.

Under the application scenario with candidate label word or phrase, the following manner may be employed upon using the label marking model obtained by the training unit 203 to mark the word or phrase to be marked in the text data: after replacing the word or phrase to be marked in the text data with the candidate label word or phrase, inputting the replacement text into the label marking model; according to an output result of the label marking model, taking a probability that the replacement text belongs to the label word replacement class as a score result of the candidate label word or phrase; taking a candidate label word whose score result satisfies a first preset condition as the label marking results of the word or phrase to be marked.

Under the application scenario without candidate label word or phrase, the following manner may be employed upon using the label marking model obtained by the training unit 203 to mark the word or phrase to be marked: inputting the text data and the word or phrase to be marked into the label marking model; according to an output result of the label marking model, taking a probability that the label word or phrase belong to the label marking results of the word or phrase to be marked as a score result of each of the label word or phrase; selecting a label word whose score result satisfies a second preset condition as the label marking result of the word or phrase to be marked.

According to embodiments of the present disclosure, the present disclosure further provides an electronic device and a computer readable storage medium.

Figure 3:
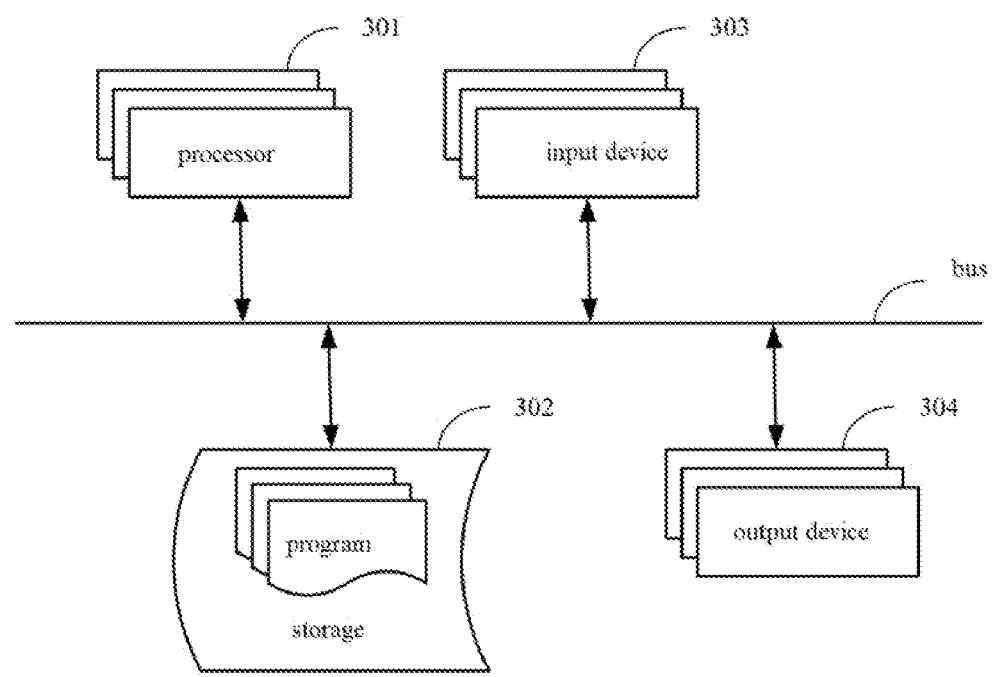
FIG. 3 illustrates a block diagram of an electronic device for implementing the method for creating the label marking model according to an embodiment of the present disclosure.

With reference to FIG. 3, it shows a block diagram of an electronic device for implementing the method for creating a label marking model according to embodiments of the present disclosure. The electronic device is intended to represent various forms of digital computers, such as laptops, desktops, workstations, personal digital assistants, servers, blade servers, mainframes, and other appropriate computers. The electronic device is further intended to represent various forms of mobile devices, such as personal digital assistants, cellular telephones, smartphones, wearable devices and other similar computing devices. The components shown here, their connections and relationships, and their functions, are meant to be exemplary only, and are not meant to limit implementations of the disclosure described and/or claimed in the text here.

With reference to FIG. 3, the electronic device comprises: one or more processors 301, a storage 302, and interfaces connected to components and including a high-speed interface and a low speed interface. Each of the components are interconnected using various busses, and may be mounted on a common motherboard or in other manners as appropriate. The processor may process instructions for execution within the electronic device, including instructions stored in the storage or on the storage device to display graphical information for a GUI on an external input/output device, such as a display device coupled to the interface. In other implementations, multiple processors and/or multiple buses may be used, as appropriate, along with multiple storages and types of storage. Also, multiple electronic devices may be connected, with each device providing portions of the necessary operations (e.g., as a server bank, a group of blade servers, or a multi-processor system). One processor 301 is taken as an example in FIG. 3.

The storage 302 is a non-transitory computer-readable storage medium provided by the present disclosure. Wherein, the storage stores instructions executable by at least one processor, so that the at least one processor executes the method for creating a label marking model according to the present disclosure. The non-transitory computer-readable storage medium of the present disclosure stores computer instructions, which are used to cause a computer to execute the method for creating a label marking model according to the present disclosure.

The storage 302 is a non-transitory computer-readable storage medium and may be used to store non-transitory software programs, non-transitory computer executable programs and modules, such as program instructions/modules corresponding to the method for creating a label marking model according to the present disclosure (e.g., the obtaining unit 201, the constructing unit 202 and the training unit 203 shown in FIG. 2). The processor 301 executes various functional applications and data processing of the server, i.e., implements the method for creating a label marking model according to the present disclosure, by running the non-transitory software programs, instructions and units stored in the storage 302.

The storage 302 may include a storage program region and a storage data region, wherein the storage program region may store an operating system and an application program needed by at least one function; the storage data region may store data created according to the use of the electronic device for implementing the data analysis method based on the intelligent speech device according to the present disclosure. In addition, the storage 302 may include a high-speed random access memory, and may also include a non-transitory memory, such as at least one magnetic disk storage device, a flash memory device, or other non-transitory solid-state storage device. In some embodiments, the storage 302 may optionally include a memory remotely arranged relative to the processor 301, and these remote storages may be connected to the electronic device for implementing the method for creating a label marking model through a network. Examples of the above network include, but are not limited to, the Internet, an intranet, a local area network, a mobile communication network, and combinations thereof.

The electronic device for implementing the method for creating a label marking model may further include an input device 303 and an output device 304. The processor 301, the storage 302, the input device 303 and the output device 304 may be connected through a bus or in other manners. In FIG. 3, the connection through the bus is taken as an example.

The input device 303 may receive inputted numeric or character information and generate key signal inputs related to user settings and function control of the electronic device for implementing the method for creating a label marking model, and may be an input device such as a touch screen, keypad, mouse, trackpad, touchpad, pointing stick, one or more mouse buttons, trackball and joystick. The output device 304 may include a display device, an auxiliary lighting device (e.g., an LED), a haptic feedback device (for example, a vibration motor), etc. The display device may include but not limited to a Liquid Crystal Display (LCD), a Light Emitting Diode (LED) display, and a plasma display. In some embodiments, the display device may be a touch screen.

Various implementations of the systems and techniques described here may be realized in digital electronic circuitry, integrated circuitry, specially designed ASICs (Application Specific Integrated Circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to send data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" and "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and a server are generally remote from each other and typically interact through a communication network. The relationship of client and server arises by virtue of computer programs running on the respective computers and having a client-server relationship to each other.

According to technical solutions of embodiments of the present disclosure, training is performed for the normal label marking task, and training is also performed for the word or phrase replacing task, so that the created label marking model may, in addition to learning the information of the word or phrase themselves, sufficiently learn the relationship between the context of the word or phrase and the label word or phrase thereof, and so that the label marking model may be adapt for multiple marking scenarios whilst improving the accuracy in marking word or phrase.

It should be understood that the various forms of processes shown above may be used to reorder, add, or delete steps. For example, the steps described in the present disclosure may be performed in parallel, sequentially, or in different orders as long as the desired results of the technical solutions disclosed in the present disclosure may be achieved, which is not limited herein.

The foregoing specific implementations do not constitute a limitation on the protection scope of the present disclosure. It should be understood by those skilled in the art that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for creating a label marking model implemented by a computer, comprising:
   obtaining text data and determining a word or phrase to be marked in the text data;
   according to the word or phrase to be marked, constructing first training samples of the text data corresponding to a word or phrase replacing task and a second training sample corresponding to a label marking task;
   wherein the first training samples comprise the text data and a replacement text with the word or phrase replaced with a substitute word or phrase, and the substitute word or phrase comprises at least one type of: a label word or phrase associated with the word or phrase to be marked, an appositive word or phrase associated with the word or phrase to be marked, and a label word or phrase not associated with the word or phrase to be marked; and
   training a neural network model with a plurality of the first training samples and a plurality of the second training samples, respectively, until a loss function of the word or phrase replacing task and a loss function of the label marking task satisfy a preset condition, to obtain the label marking model,
   wherein the word or phrase replacing task is a task for predicting a replacement class of the replacement text corresponding to the type of the substitute word or phrase,
   wherein constructing the second training sample of the text data corresponding to the label marking task according to the word or phrase to be marked comprises:
      obtaining a label word or phrase associated with the word or phrase to be marked, and taking the label word or phrase as a label marking result of the word or phrase to be marked; and
      taking the text data, the word or phrase to be marked and the label marking result corresponding to the word or phrase to be marked as the second training sample.

2. The method according to claim 1, wherein the determining the word or phrase to be marked in the text data comprises:
   obtaining part-of-speeches of words or phrases in the text data after performing word segmentation on the text data; and
   taking a word or phrase whose part-of-speech belongs to a preset part-of-speech as the word or phrase to be marked.

3. The method according to claim 1, wherein constructing the first training sample of the text data corresponding to the word or phrase replacing task according to the word or phrase to be marked comprises:
   obtaining the substitute word or phrase corresponding to the word or phrase to be marked; after replacing the word or phrase to be marked in the text data with the substitute word or phrase, taking a class of the substitute word or phrase as a replacement class marking result of the replacement text; and
   taking the replacement text and the replacement class marking result corresponding to the replacement text as the first training sample.

4. The method according to claim 3, wherein the obtaining the substitute word or phrase corresponding to the word or phrase to be marked comprises:
   determining identification information of the word or phrase to be marked in a preset knowledge base; and obtaining the substitute word or phrase in the preset knowledge base corresponding to the identification information.

5. The method according to claim 3, wherein training the neural network model with a plurality of the first training samples comprises:
taking the replacement text as input, and taking the replacement class marking result corresponding to the replacement text as output, so that the neural network model is able to, according to the input replacement text, output a probability that the input replacement text belongs to a replacement class.

6. The method according to claim 1, wherein training the neural network model with a plurality of the second training samples comprises:
taking the text data and the word or phrase to be marked as input, and taking the label marking result corresponding to the word or phrase to be marked as output, so that the neural network model is able to, according to the input text data and the word or phrase to be marked, output a probability that the label word or phrase belong to the label marking result of the word or phrase to be marked.

7. The method according to claim 1, wherein training the neural network model with a plurality of the first training samples comprises:
dividing the word or phrase replacing task into a label word or phrase replacing subtask and an appositive word or phrase replacing subtask; and
completing the training with the word or phrase replacing task based on the training samples in the plurality of the first training samples corresponding to the two subtasks.

8. An electronic device, comprising:
at least one processor; and
a storage communicatively connected with the at least one processor; wherein,
the storage stores instructions executable by the at least one processor, and the instructions are executed by the at least one processor to enable the at least one processor to perform a method for creating a label marking model, wherein the method comprises:
obtaining text data and determining a word or phrase to be marked in the text data;
according to the word or phrase to be marked, constructing first training samples of the text data corresponding to a word or phrase replacing task and a second training sample corresponding to a label marking task;
wherein the first training samples comprise the text data and a replacement text with the word or phrase replaced with a substitute word or phrase, and the substitute word or phrase comprises at least one type of: a label word or phrase associated with the word or phrase to be marked, an appositive word or phrase associated with the word or phrase to be marked, and a label word or phrase not associated with the word or phrase to be marked; and
training a neural network model with a plurality of the first training samples and a plurality of the second training samples, respectively, until a loss function of the word or phrase replacing task and a loss function of the label marking task satisfy a preset condition, to obtain the label marking model,
wherein the word or phrase replacing task is a task for predicting a replacement class of the replacement text corresponding to the type of the substitute word or phrase,
wherein constructing the second training sample of the text data corresponding to the label marking task according to the word or phrase to be marked comprises:
obtaining a label word or phrase associated with the word or phrase to be marked, and taking the label word or phrase as a label marking result of the word or phrase to be marked; and
taking the text data, the word or phrase to be marked and the label marking result corresponding to the word or phrase to be marked as the second training sample.

9. The electronic device according to claim 8, wherein the determining the word or phrase to be marked in the text data comprises:
obtaining part-of-speeches of words or phrases in the text data after performing word segmentation on the text data; and
taking a word or phrase whose part-of-speech belongs to a preset part-of-speech as the word or phrase to be marked.

10. The electronic device according to claim 8, wherein constructing the first training sample of the text data corresponding to the word or phrase replacing task according to the word or phrase to be marked comprises:
obtaining the substitute word or phrase corresponding to the word or phrase to be marked;
after replacing the word or phrase to be marked in the text data with the substitute word or phrase, taking a class of the substitute word or phrase as a replacement class marking result of the replacement text; and
taking the replacement text and the replacement class marking result corresponding to the replacement text as the first training sample.

11. The electronic device according to claim 10, wherein the obtaining the substitute word or phrase corresponding to the word or phrase to be marked comprises:
determining identification information of the word or phrase to be marked in a preset knowledge base; and
obtaining the substitute word or phrase in the preset knowledge base corresponding to the identification information.

12. The electronic device according to claim 10, wherein training the neural network model with a plurality of the first training samples comprises:
taking the replacement text as input, and taking the replacement class marking result corresponding to the replacement text as output, so that the neural network model is able to, according to the input replacement text, output a probability that the input replacement text belongs to a replacement class.

13. The electronic device according to claim 8, wherein training the neural network model with a plurality of the second training samples comprises:
taking the text data and the word or phrase to be marked as input, and taking the label marking result corresponding to the word or phrase to be marked as output, so that the neural network model is able to, according to the input text data and the word or phrase to be marked, output a probability that the label word or phrase belong to the label marking result of the word or phrase to be marked.

14. The electronic device according to claim 8, wherein training the neural network model with a plurality of the first training samples comprises:

dividing the word or phrase replacing task into a label word or phrase replacing subtask and an appositive word or phrase replacing subtask; and completing the training with the word or phrase replacing task based on the training samples in the plurality of the first training samples corresponding to the two subtasks.

15. A non-transitory computer-readable storage medium storing computer instructions therein, wherein the computer instructions are used to cause the computer to perform a method for creating a label marking model, wherein the method comprises:

obtaining text data and determining a word or phrase to be marked in the text data;

according to the word or phrase to be marked, constructing first training samples of the text data corresponding to a word or phrase replacing task and a second training sample corresponding to a label marking task;

wherein the first training samples comprise the text data and a replacement text with the word or phrase replaced with a substitute word or phrase, and the substitute word or phrase comprises at least one type of: a label word or phrase associated with the word or phrase to be marked, an appositive word or phrase associated with the word or phrase to be marked, and a label word or phrase not associated with the word or phrase to be marked; and training a neural network model with a plurality of the first training samples and a plurality of the second training samples, respectively, until a loss function of the word or phrase replacing task and a loss function of the label marking task satisfy a preset condition, to obtain the label marking model, wherein the word or phrase replacing task is a task for predicting a replacement class of the replacement text corresponding to the type of the substitute word or phrase, wherein constructing the second training sample of the text data corresponding to the label marking task according to the word or phrase to be marked comprises:

obtaining a label word or phrase associated with the word or phrase to be marked, and taking the label word or phrase as a label marking result of the word or phrase to be marked; and taking the text data, the word or phrase to be marked and the label marking result corresponding to the word or phrase to be marked as the second training sample.

16. The non-transitory computer-readable storage medium according to claim 15, wherein constructing the first training sample of the text data corresponding to the word or phrase replacing task according to the word or phrase to be marked comprises:

obtaining the substitute word or phrase corresponding to the word or phrase to be marked;

after replacing the word or phrase to be marked in the text data with the substitute word or phrase, taking a class of the substitute word or phrase as a replacement class marking result of the replacement text; and taking the replacement text and the replacement class marking result corresponding to the replacement text as the first training sample.

17. The non-transitory computer-readable storage medium according to claim 16, wherein training the neural network model with a plurality of the first training samples comprises:

taking the replacement text as input, and taking the replacement class marking result corresponding to the replacement text as output, so that the neural network model is able to, according to the input replacement text, output a probability that the input replacement text belongs to a replacement class.

* * * * *